United States Patent

[11] 3,564,314

[72] Inventor Arthur W. Haydon
    Breakneck, Conn.
[21] Appl. No. 840,911
[22] Filed July 11, 1969
[45] Patented Feb. 16, 1971
[73] Assignee Tri-Tech, Incorporated
    Waterbury, Conn.
    a corporation of Connecticut
    Continuation-in-part of application Ser. No. 687,843, Dec. 4, 1967, now Patent No. 3,495,111.

[54] ROTOR-STATOR CAPSULE CONSTRUCTION
    16 Claims, 23 Drawing Figs.
[52] U.S. Cl. .................................................. 310/172, 310/156
[51] Int. Cl. .................................................. H02k 17/10
[50] Field of Search ........................................ 310/172, 42, 49, 156, 162, 163, 164, 254, 257, 258

[56] References Cited
    UNITED STATES PATENTS
    1,534,282  4/1925  Packard ................. 310/172
    2,128,719  8/1938  Thompson ............... 310/163
    2,402,380  6/1946  Dicke ..................... 310/163
    2,450,955  10/1948 Hansen .................... 310/164
    2,511,698  6/1950  Dickey .................... 310/172
    2,951,957  9/1960  Eigeman ................... 310/164

Primary Examiner—Milton O. Hirshfield
Assistant Examiner—R. Skudy
Attorney—Lee C. Robinson, Jr.

ABSTRACT: A rotor-stator capsule for use with a field-winding to form an electric motor. The rotor of the capsule comprises a slender cylinder of permanently magnetized ferrite material, while the stator structure includes a pair of stator pole pieces at opposite ends of the rotor, each pole piece has a flat portion and two salient stator poles extending perpendicularly from the periphery of the flat portion in radially spaced relationship with the rotor. A tubular dust cover surrounding the rotor serves as a part of the shading assembly used to make the motor unidirectionally self-starting and this dust cover lies in the airgap between the rotor and the stator poles and extends axially along these poles for the length of the rotor. The shading assembly also is provided with a shading member which is interwoven with the stator poles and cooperates with the dust cover to complete the magnetic circuit.

ROTOR-STATOR CAPSULE CONSTRUCTION

CROSS REFERENCE TO RELATED APPLICATION

This application is a continuation-in-part of copending application Ser. No. 687,843, filed Dec. 4, 1967 by Arthur W. Haydon, and entitled SMALL PERMANENT MAGNET ROTOR SHADED POLE MOTOR, now U.S. Pat. No. 3,495,111 granted Feb. 10, 1970.

BACKGROUND OF THE INVENTION

This invention pertains to components which are usable as the power delivering portion of small, miniature or factional horsepower electric motors of the AC synchronous, stepping or brushless DC type. More particularly, it pertains to a novel unitary rotor-stator capsule device for use with a source of fluctuating magnetic flux to form a complete motor.

Heretofore, manufacturers in various industries such as the timer and clock industry, for example, have had many different requirements for coils, leads, gear trains, etc., in their motors depending on the purpose and environment in which the motors were to be used. This resulted in motor manufacturers making a variety of different motors specially designed for each requirement. With the rotor-stator device of this invention, however, the power delivering portion of the motor can be made in a single unit and mass produced at low cost and in standard sizes. In addition, the power-delivering portion can be made as a unitary structure with a dust-resistant cover protecting the rotor. The thus mass produced portion is combined with coils, leads, gear trains, etc., which are specifically designed to meet the requirements of a particular manufacturer. The resulting combination provides a motor which is extremely efficient and exhibits other important advantages.

SUMMARY OF THE INVENTION

The invention comprises a compact rotor-stator device including a permanent magnet rotor having at least two rotor poles, a stator of magnetic material comprising a pair of opposed pole pieces, each having a flat portion and at least two salient stator poles projecting perpendicularly from the periphery of the flat portion, the stator poles being arranged in a circumferential array parallel to but spaced radially apart from the rotor, and means for shading a selected stator pole on each pole piece. Preferably at least a portion of the shading means lies in the airgap between the rotor and the selected stator pole members.

Having the stator poles extend perpendicularly from the periphery of the flat portions of the pole pieces enables the device to be small, compact and usable with a large variety of alternating magnetic flux sources. As contrasted to prior rotor-stator devices, the smaller construction allows the use of less copper to produce the desired shading effect and permits the use of larger diameter wire in the structure of the fluctuating magnetic flux source with which the device is employed. In addition, this construction enables the assembly to be manufactured economically to meet airgap and other requirements of rotor-stator devices in small self-starting electric motors. Still another advantage is that it permits the use of stampings for the stator pole pieces which are of simplified construction.

The rotor preferably comprises a slim cylindrical permanent magnet having a greater length than its diameter and including a pair of nonsalient rotor poles. For best results, the rotor is made of any one of a number of relatively magnetically hard permanently magnetized materials. Ceramic magnetic material, barium ferrite, platinum-cobalt, samarium cobalt or even Alnico materials are all satisfactory. The use of a rotor of greater length than diameter minimizes the rotational inertia of the rotor. This is particularly helpful in applications requiring a fast response time, such as in stepper motors for example.

A principal advantage of the invention is that the device is a complete package in itself: a unitary component which can be used under a variety of conditions and with a number of structures for a variety of purposes. The device fixes all the critical dimensions and parameters of rotor-stator devices in electric rotating machines and can be inserted in a coil, mounted between the legs of an iron flux carrier having a coil surrounding the portion joining the legs, mounted between two bent up legs of a clock plate to power an electric clock movement, or as the rotor-stator portion of an electric meter motor. The device is preferably provided with its own bearings, thus further facilitating the assembly of the device by the purchaser with a suitable flux source, gear train, etc.

Further, other and additional aspects of the invention will appear from the following description of certain preferred embodiments.

DETAILED DESCRIPTION OF CERTAIN PREFERRED EMBODIMENTS

Referring to FIGS. 1—6 of the drawings, there is shown an electric motor having a rotor-stator assembly indicated generally at 100.

Figure 1:
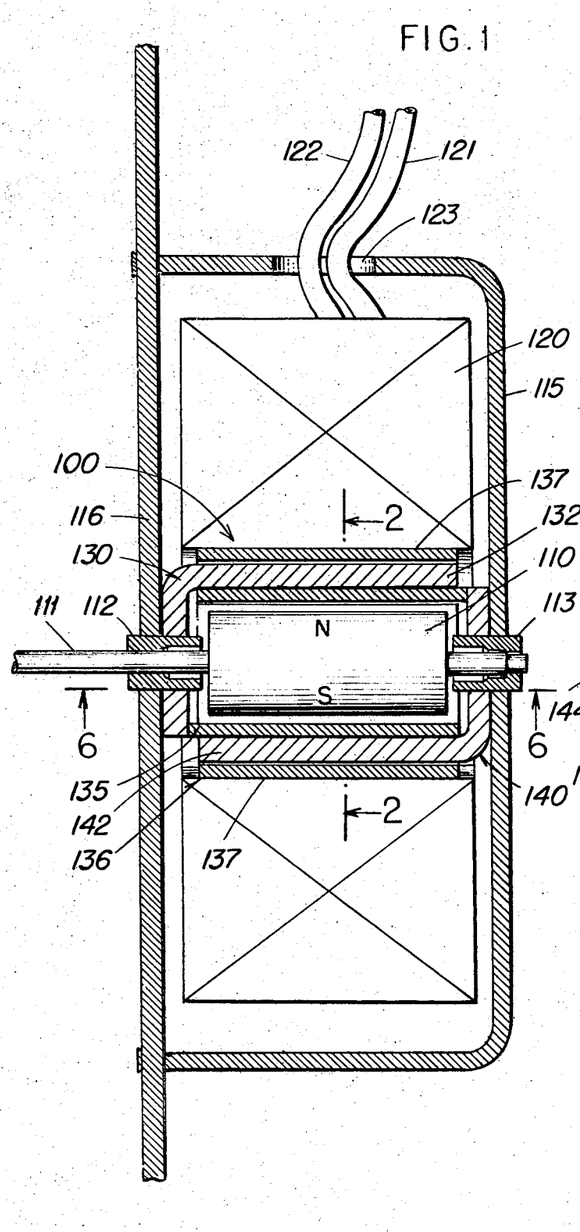
FIG. 1 is a vertical sectional view, partially in elevation, of an illustrative motor embodiment of the invention having four salient stator poles.

The assembly includes a stator structure 105 coaxially surrounding a permanent magnet rotor 110 mounted on a shaft 111 which is rotatably carried in bearings 112 and 113. A cup-shaped member 115 and a base plate 116 form a housing for the assembly 100 and for a field coil 120. The field coil 120 is coaxially mounted around the assembly 100 and has two leads 121 and 122 which protrude through a hole 123 in the cup-shaped member 115.

The stator structure 105 of the rotor-stator device 100 includes two pole pieces 130 and 140 arranged adjacent opposite ends of the rotor 110. The pole piece 130 comprises two salient poles 132 and 134 and an integrally formed flat portion 131. Likewise, the pole piece 140 is comprised of two salient poles 142 and 144 and an integrally formed flat portion 141. The flat portions 131 and 141 of the pole pieces 130 and 140 are respectively provided with centrally located holes 133 and 143 which serve as mounting apertures for the bearings 112 and 113. The bearings protrude through their corresponding apertures in the pole pieces and are removably disposed in mating apertures in the cup-shaped member 115 and the base plate 116. The salient poles of both pole pieces project perpendicularly from the peripheral edges of the flat portions 131 and 141 and form an arcuate array around the rotor 110 parallel to its length when the device is assembled.

Figure 2:
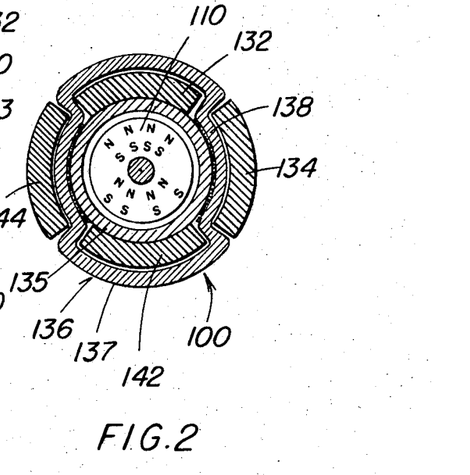
FIG. 2 is a fragmentary sectional view of the rotor-stator assembly of the embodiment of FIG. 1 taken on line 2–2 of that FIG.
Figure 3:
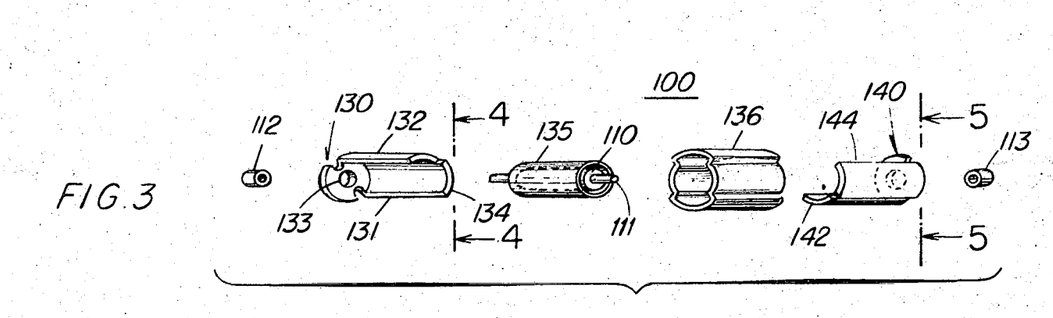
FIG. 3 is an exploded view in perspective of the rotor-stator assembly of FIG. 2 showing its various parts.
Figure 4:
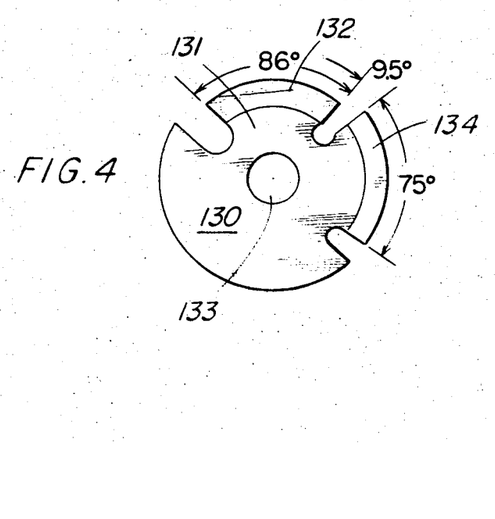
FIG. 4 is an end elevational view of one of the stator pole pieces of the FIG. 1 embodiment as seen from the line 4–4 of FIG. 3.
Figure 5:
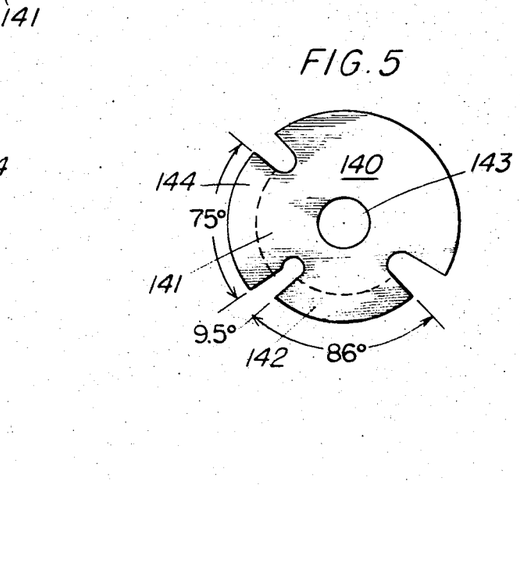
FIG. 5 is an end elevational view of the other stator pole piece of the FIG. 1 embodiment as seen from the line 5–5 of FIG. 3.

Connecting this array of pole pieces, and surrounding the rotor 110, are means for shading selected ones of the pole members. The shading means includes a tubular member 135 which forms a dust cover for the rotor 110 and a second tubular member 136 which is crimped into four integrally connected arcuate wall sections alternating between large radius sectors 137 and small radius sectors 138. As best shown in FIG. 2, the tubular member 136 passes over the outer faces of the stator poles 132 and 142 and under the inner faces of the stator poles 134 and 144, with the portions of the tubular member 136 between poles 132 and 142 being tinned or otherwise affixed to the inner tube 135 to achieve a good electrical connection between the two tube members.

Figure 6:
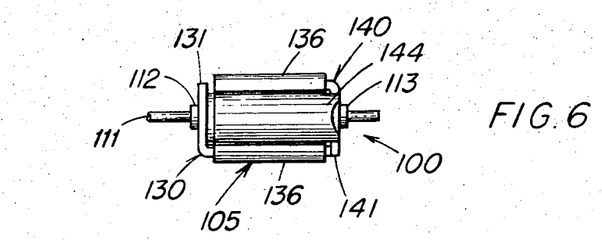
FIG. 6 is a side view of the motor of FIG. 1 as seen from the line 6–6 of that FIG.
Figure 7:
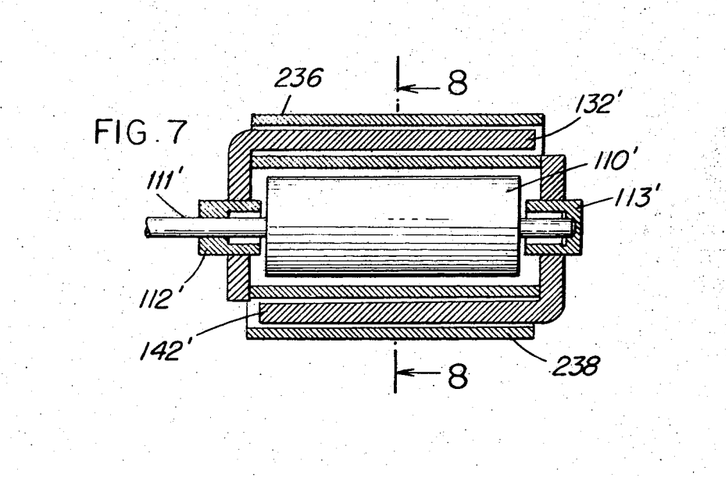
FIG. 7 is a vertical sectional view, with a portion shown in elevation, of a modified four-pole embodiment of the rotor-stator assembly.
Figure 8:
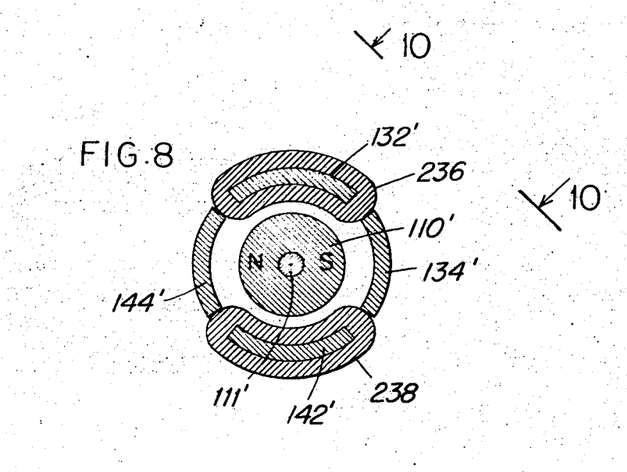
FIG. 8 is a fragmentary sectional view of the rotor-stator assembly embodiment of FIG. 7 as seen from the line 8–8 of that FIG.
Figure 9:
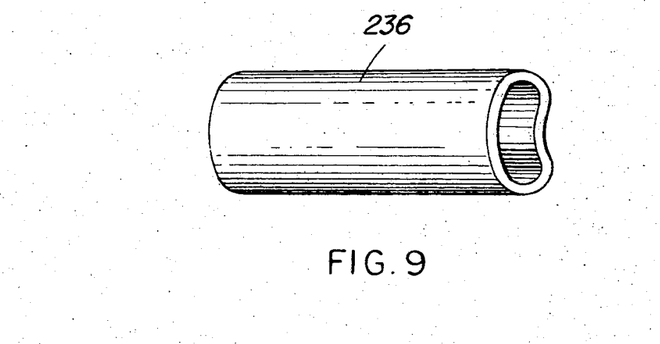
FIG. 9 is a perspective view of one of the shading tubes shown in FIG. 8.
Figure 10:
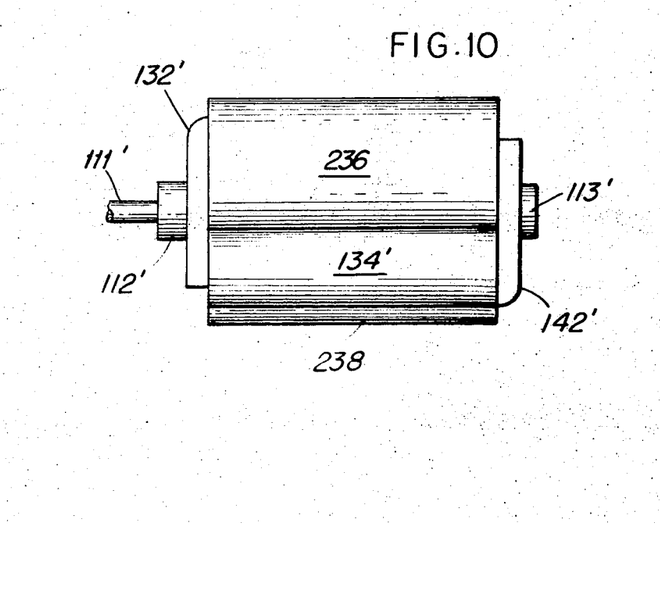
FIG. 10 is a perspective view of the embodiment of FIG. 7 as seen from line 10–10 of FIG. 8.
Figure 11:
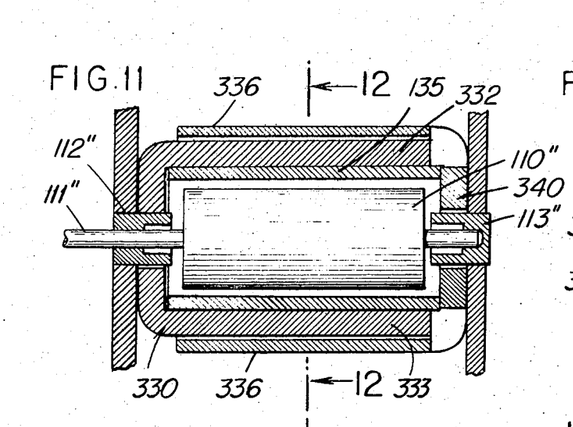
FIG. 11 is a vertical sectional view of a further embodiment of the invention having eight salient stator poles with certain portions shown broken away and others in elevation.

When thus joined together the tubular members 135 and 136 form shading sleeves for the stator poles 132 and 142 which fit over these poles and are parallel to the rotor 110. Preferably, both tubular members 135 and 136 are made of copper, though they may also be made of other nonmagnetic, conductive materials such as aluminum or silver. This shading structure delays the buildup of magnetic flux in the stator poles 132 and 142 and thus imparts a unidirectional self-starting characteristic to the device when fed with alternating pulses or fluctuating electrical current. The construction additionally serves to hold the pole pieces 130 and 140 in non-rotatable relationship to each other and when assembled, as shown in FIG. 6, forms a tight, cylindrical dust cover for the rotor 110. This keeps the rotor free of magnetic particles and other foreign matter.

The shaded stator poles 132 and 142 are spaced radially closer to rotor 110 than the unshaded stator poles 134 and 144. In addition the unshaded stator poles on each pole piece extend through a 75° arc, whereas the shaded poles extend through an 86° arc. The two poles on each pole piece are separated by about 9.5°. The nonuniform radial spacing of the stator poles is provided so that the magnetic reluctance in the rotor-stator airgap is less under the shaded stator poles 132 and 142 than under the unshaded stator poles 134 and 144. This ensures that the rotor will stop in at least one of two known quiescent positions, 180° apart, which is a particularly advantageous feature in stepper motor applications. It additionally cooperates with the shading structure comprised of members 135 and 136 to make the motor self-starting as well as unidirectional.

The stator pieces 130 and 140 are as well as the housing member 115 and base plate 116 are preferably stamped from cold rolled steel of suitable thickness, though they may also be made of other magnetic material such as powdered iron in other embodiments. The cold rolled steel of the stator structure in the preferred embodiment is about .045 inches thick.

The tubular members 135 and 136 are made of tinned copper about .024 an and .025 inches thick, respectively. Instead of making these members separately and then tinning them together, the invention also includes the concept of extruding the shading structure as a single extruded tube having a central passage and two opposed sleeve passages into which the stator poles 132, 142 fit.

The rotor 110 in a preferred embodiment comprises a long, slim cylinder of magnetic material which is magnetized permanently with a north pole on the periphery of one axial half and a south pole on the periphery of the other (See FIGS. 1 and 2). A relatively "hard" material magnetically is used so as to have high coercivity, low permeability, a low specific gravity and a high magnetic energy product. For best results the magnetic energy product should be at least $3.0 \times 10^6$ gauss-oersteds along the axis of magnetic orientation. Representative examples of such materials are Ceramagnet A, A19 and A70 manufactured by Stackpole Carbon Company, Electronic Components Division, St. Marys, Penna., and Index I and Index V manufactured by Indiana General Corporation, Valparaiso, Ind. These are of barium ferrite having a composition $Ba Fe_{12} O_{19}$. Another suitable material is Plastiform available from the Leyman Corporation, Cincinnati, Ohio. The rotor also may be fabricated from a 77 percent platinum, 23 percent cobalt material made by the Hamilton Watch Company of Lancaster, Penna. This latter material has a residual induction of 6,400 gauss, a coercive force of 4300 oersteds and a maximum energy product of $9.0 \times 10^6$ gauss-oersteds. Another material known as samarium cobalt with an energy product of $20 \times 10^6$ gauss-oersteds is also usable with good results.

The rotor 110 is provided with an axial hole into which the shaft 111 is secured by cementing, moulding or other suitable techniques. If desired, a series of comparatively thin washers of the magnetized material may be placed in stacked relationship with each other and held together by an adhesive to form the rotor. In still other embodiments, particularly if Plastiform is used, the rotor material is extruded in tubular form, cut to length and pressed onto the shaft.

Many prior rotor-stator devices use a comparatively large number of stator and rotor poles which require a relatively large circumferential area of rotor surface to accommodate these poles in order to have a useful torque output. To achieve such a large circumferential area, the prior devices commonly are provided with a rotor having a relatively large diameter when compared with its length. Since the rotational inertial of the rotor varies directly with the fourth power of its diameter, a large diameter rotor will have a greater rotational inertia than the slim rotor 110 described above. The small rotational inertia in the rotor 110 is a particular advantage when the rotor-stator device 100 is used in a stepper motor, in which the rotor must respond quickly to electrical impulses applied to the field coil.

In the embodiment of FIGS. 1—6, there are employed only four long salient stator poles. This construction facilitates the use of a "slim" rotor, that is, one having a greater length than diameter, which results in a substantially higher output torque than that of prior motors of similar input power requirements. A relatively high torque is produced when the ratio of rotor length to diameter is within the range of from about 1.25 to 1 to about 2 to 1. It appears that a ratio of 1.5 to 1 is particularly suitable. The net usable torque falls off markedly when this ratio approaches 1 to 1.

The power requirements of the field coil 120 vary as the type of winding used. The motor incorporating the rotor-stator device may be powered by alternating current or by a series of direct current pulses of alternating polarity. In the first case it will operate as an AC synchronous motor and in the second case as a brushless DC motor.

When alternating current is applied to the field coil 120 through the leads 121 and 122, a magnetic field is generated. For the purpose of this example it is assumed that on the receipt of the initial half wave of the incoming current the field coil 120 has a north magnetic pole on the left side and a south pole on the right side, as viewed in FIG. 1. The magnetic flux generated in the field coil 120 is conducted through the cup-shaped member 115 to the stator pole piece 140, giving the stator poles 142 and 144 a south magnetic polarity. Likewise, the magnetic flux from the field coil 120 is conducted through the base plate 116 to the stator pole piece 130, giving the stator poles 132 and 134 a north magnetic polarity.

As discussed above, the closer radial spacing of the shaded poles 132 and 142 causes the rotor 110 to have two quiescent stopping positions 180° apart. The magnetic poles of the rotor 110 are attracted to the closer shaded stator poles 132 and 142 and align opposite them. Assuming that the north pole (N) of the rotor 110 is aligned opposite the stator pole 132 and the south pole is aligned opposite the stator pole 142 as illustrated in FIG. 2, when the field coil 120 is energized the north pole of the rotor 110 is attracted to the stator pole 144, which is of south magnetic polarity, and the south pole of the rotor 110 is attracted to the stator pole 134, which is of north magnetic polarity. Thus the rotor starts in a counterclockwise direction as viewed in FIG. 2. Because of the low inertia of the rotor and the design of the stator structure, the rotor reaches synchronous speed within the first half wave of the correct polarity. As the electrical input to the field coil 120 changes polarity in response to the next half wave, the magnetic polarities of the respective stator poles change and continue to drive the rotor in a counterclockwise direction at synchronous speed.

If the initial half wave applied to the field coil 120 is of the opposite polarity, the rotor 110 rotates clockwise somewhat less than 90 mechanical degrees and then reverses direction with the alternation of polarity of the signal applied to the field coil 120. Irrespective of the polarity of the initial signal applied to the field coil, the rotor reaches synchronous speed within the first full cycle of the applied waveform.

Thus the novel construction of the rotor-stator device 100 provides a unidirectional synchronous motor which exhibits substantially instantaneous self-starting characteristics.

Referring now to FIGS. 7—10, a second preferred embodiment of the rotor-stator device is shown comprising a rotor 110', a shaft 111', bearings 112' and 113', pole pieces 130' and 140' and salient stator poles 132', 134', 142' and 144', as in the embodiment of FIGS. 1—6, but with the addition of modified shading tubes 236 and 238 in place of the shading tubes 135 and 136. The tubes 236 and 238 are made of nonmagnetic conductive material and are closely fitted around the oppositely disposed stator poles 132' and 142', respectively, parallel to their length. Thus each of the shading sleeves 236 and 238 by itself forms a complete shading ring. This eliminates the need for the tubular member 135 and the necessity of tinning two shading members together, and thus it is a less expensive construction than the embodiment of FIGS. 1—6. The arcuate width of each of the stator poles 132', 134', 142' and 144' is such that the longitudinal edges of the unshaded pole 144' respectively contact the shading tubes 236 and 238, and the longitudinal edges of the unshaded pole 134' likewise contact the shading tubes 236 and 238 The stator poles and the shading tubes themselves thus form a housing for the rotor 110', and the poles and tubes may be cemented, welded, soldered, or otherwise secured together as a unitary assembly and inserted into a coil structure as in the embodiment of FIGS. 1—6.

Still another preferred embodiment according to the invention, shown in FIGS. 11—16, comprises a rotor 110", a shaft 111", and bearings 112" and 113", each similar to the embodiment of FIGS. 1—6, but with an eight pole stator structure. The rotor 110" and the shaft 111" are rotatably carried in the bearings 112" and 113". The bearing 112" is fitted into the center of a stator pole piece 330 through a hole 331, and the bearing 113" is likewise fitted into the center of the stator pole piece 340 through a hole 341.

The stator pole piece 330 is generally flat and has four salient stator poles 332, 333, 334 and 335 projecting perpendicularly from the periphery of the flat portion. The poles 332 and 333 are spaced 180° apart as are the poles 334 and 335. Likewise, the stator pole piece 340 is a generally flat member with four salient stator poles 342, 343, 344 and 345 projecting perpendicularly from its periphery. The poles 342 and 343 are spaced 180° apart as are poles 344 and 345. When the stator pole pieces 330 and 340 are arranged opposite each other and adjacent the ends of the rotor 110", the salient poles 332—335 and 342—345 form an arcuate array around the rotor 110" parallel to its length.

Figures 12, 13:
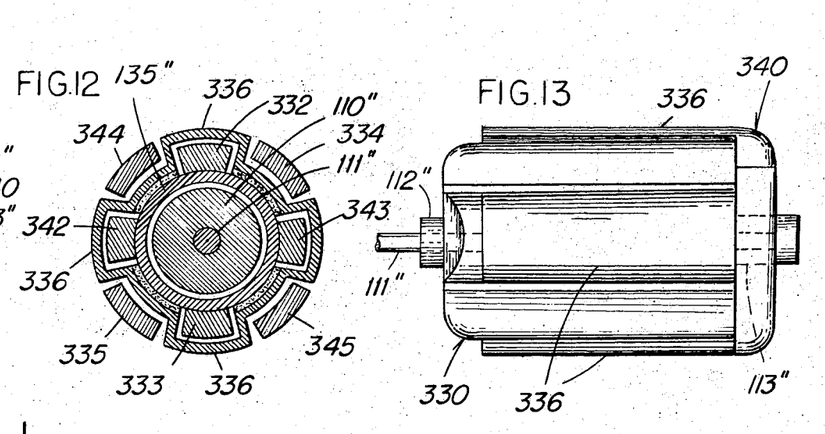
FIG. 12 is a sectional view of the embodiment of FIG. 11 as seen from the line 12–12 of that FIG.
FIG. 13 is a side view of the embodiment of FIG. 11.
Figures 14, 15, 16:
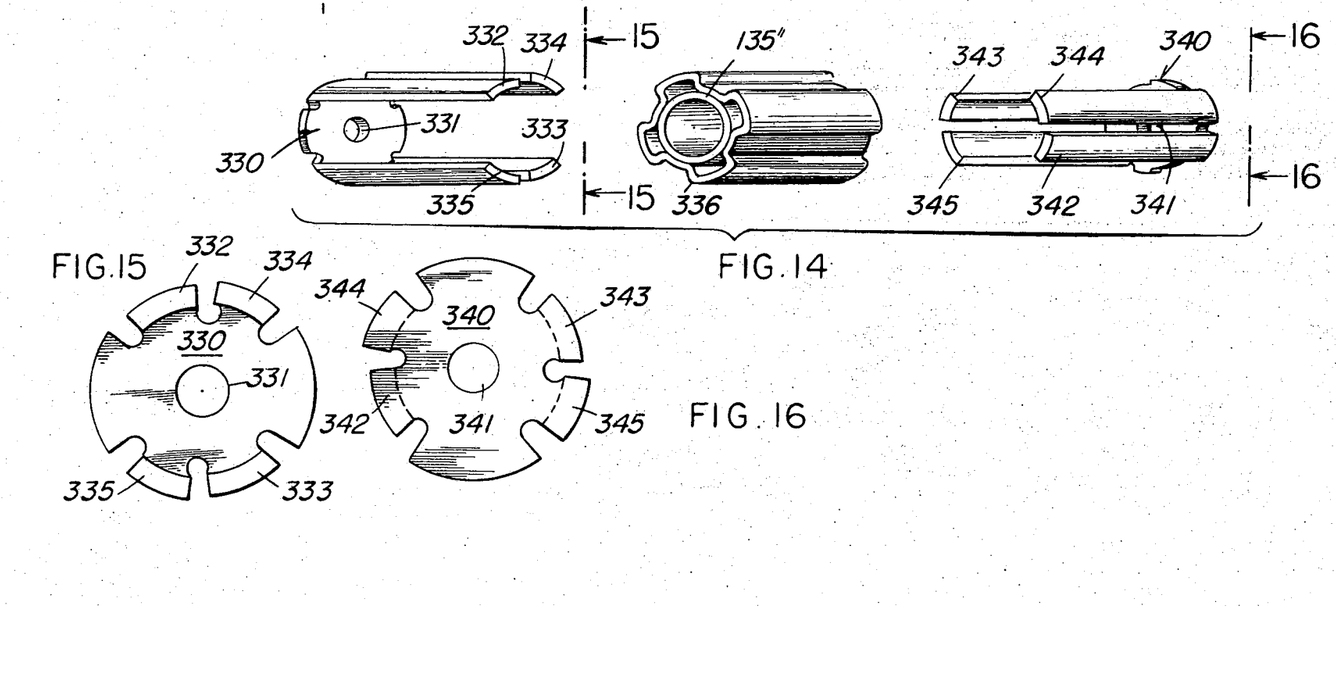
FIG. 14 is an exploded view in perspective of the stator pole pieces and shading structure of the FIG. 11 embodiment of the invention.
FIG. 15 is an end elevational view of one of the stator pole pieces of the FIG. 11 embodiment as seen from the line 15–15 of FIG. 14.
FIG. 16 is an end elevational view of the other stator pole piece of the FIG. 11 embodiment as seen from the line 16–16 of FIG. 14.

A tubular member 336 is crimped to provide eight arcuate wall sections of alternating radii and is interwoven among the stator poles 332—335 and 342—345 in a manner similar in several respects to the tubular member 136 of the embodiment of FIGS. 1—6. As best illustrated in FIG. 12, the tubular member 336 is interwoven under the inner face of the stator pole 334, over the outer face of the stator pole 343, under the inner face of the stator pole 345, over the outer face of the stator pole 333, under the inner face of the stator pole 335, over the outer face of the stator pole 342, under the inner face of the stator pole 344, and over the outer face of the stator pole 332. Where the tubular member 336 passes under the inner faces of the stator poles 334, 345, 335 and 344, it is sweat-soldered, tinned or otherwise connected to an inner tube member 135" which surrounds the rotor 110". The two tube members 135" and 336 thus cooperate to form shading sleeves around the stator poles 332, 343, 333 and 342. The tube members are constructed of nonmagnetic, conductive material such as copper or aluminum. They delay the buildup of flux in the shaded poles and help ensure unidirectional starting of the rotor-stator device.

As in the embodiment of FIGS. 1—6, when the pole pieces 330 and 340 are assembled together with the tubular members 135" and 336 the pole pieces 330 and 340 cover the ends of the tubular member 135" to form a tight, cylindrical dust cover for the rotor which keeps it free of magnetic particles and other foreign matter. In addition this compact construction holds the pole pieces 330 and 340 together in an nonrotatable fashion.

The shaded stator poles 332, 333, 342 and 343 are spaced radially closer to the rotor 110" than the unshaded poles 334, 335, 344 and 345 to give a nonuniform rotor-stator airgap. (See FIG. 12). This makes the magnetic reluctance less under the shaded poles 332, 333, 342 and 343 than under the unshaded poles 334, 335, 344 and 345, and it ensures that the rotor 110" will have a quiescent stopping position such that its magnetic poles are aligned under a pair of shaded stator poles which are 180° apart i.e., under either the shaded poles 332 and 333 or under the shaded poles 342 and 343.

The stator pole pieces, as in the first embodiment, are made of cold rolled steel or other magnetic material.

One of the operational differences between the embodiment of FIGS. 1—6 and the embodiment of FIGS. 11—16 is that the rotor in the latter rotates half as fast as the former for the same frequency of applied voltage. In a stepper motor or in other embodiments in which unidirectional current pulses are applied to the field coil, the latter device turns through one-half the number of degrees as the former device for each applied pulse. It is also within the scope of this invention to provide other embodiments using 16 stator poles, for example, in which case the rotor rotates one-fourth as fast as in the embodiment of FIGS. 1—6 for the same frequency of applied voltage.

One of the major advantages of the various illustrated embodiments of the invention is that the rotor-stator device may be sold as a separate component to manufacturers who may then combine the device with coil and housing structures according to their own specialized needs. Illustrative applications of the rotor-stator device 100 (FIGS. 1—6), for example, are shown in FIGS. 17—23.

Figures 17, 18, 19, 20, 21, 22, 23:
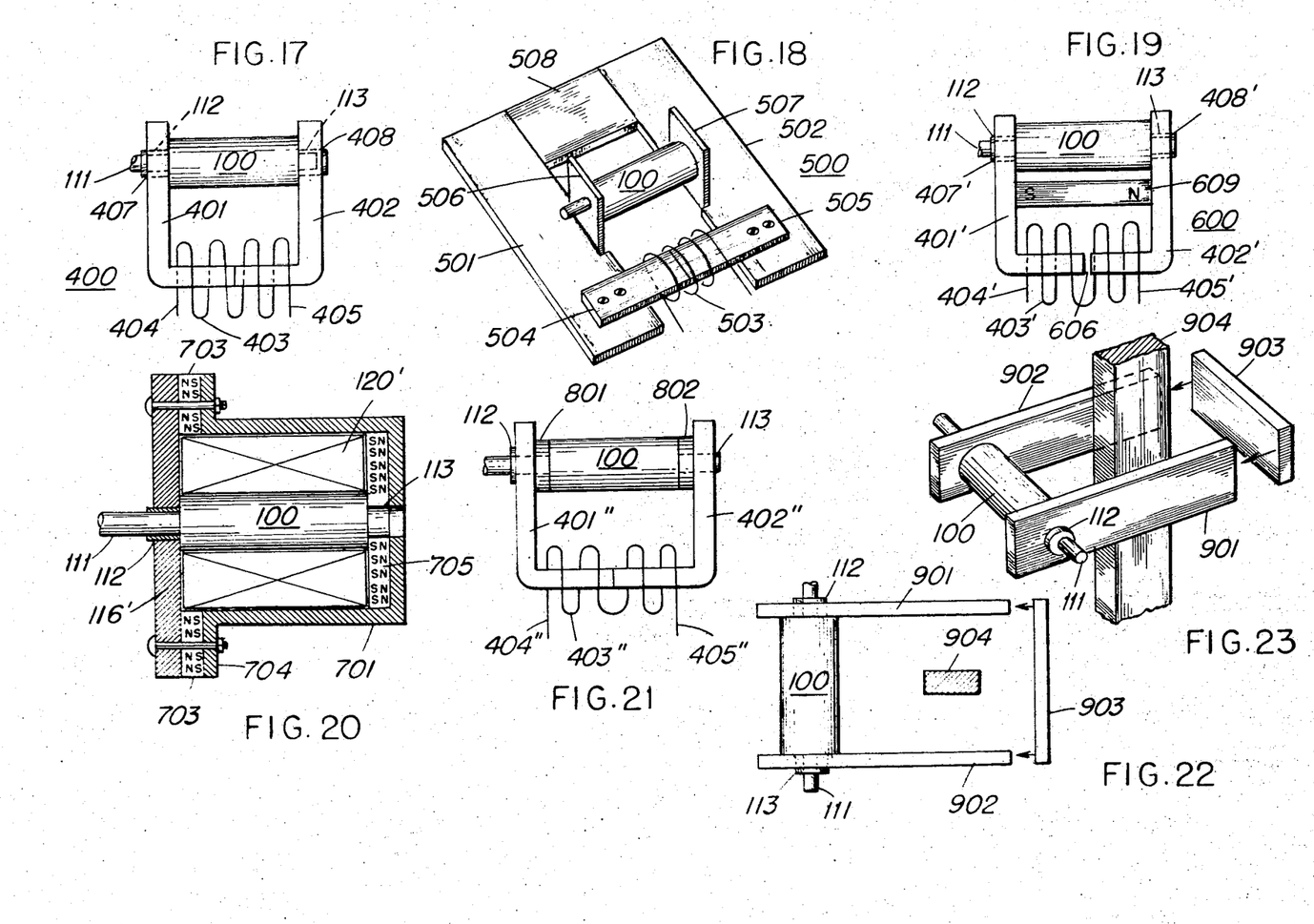
FIG. 17 is a partially schematic representation of a motor incorporating one embodiment of this invention.
FIG. 18 is a partially schematic representation of a clock motor incorporating one embodiment of this invention.
FIG. 19 is a partially schematic representation incorporating one embodiment of this invention.
FIG. 20 is a partially schematic vertical sectional view of a second stepper motor incorporating one embodiment of this invention.
FIG. 21 is a partially schematic representation of a third stepper motor incorporating one embodiment of this invention.
FIG. 22 is a partially schematic representation of a current indicating device incorporating one embodiment of this invention.
FIG. 23 is a perspective view of the structure of FIG. 22.

Referring to FIG. 17, an electric motor 400 is shown comprising a C-shaped stator structure made of two steel L-shaped members 401 and 402 and a field coil 403. The field coil (shown schematically) encircles the shorter arms of the members 401 and 402, and the members are supported with their shorter arms in contact with each other.

The rotor-stator device 100 is mounted lengthwise between the ends of the members 401 and 402 opposite those within the field coil 403. The bearings 112 aNd and 113 which protrude form the pole pieces 130 and 140 are fitted into holes 407 and 408 respectively provided in the members 401 and 402. In the embodiment of FIG. 17, the rotor shaft 111 protrudes through the hole 407 in the member 401, although in other advantageous arrangements the rotor shaft 111 protrudes through the hole 408 in the opposite member or through both holes.

When a source of alternating current or a series of direct current pulses of alternating polarity is applied to leads 404 and 405 of the coil 403, a varying magnetic flux is generated in the members 401 and 402 which is transmitted to the pole pieces 130 and 140 (FIG. 1), respectively. This varying magnetic flux passes into the shaded and unshaded stator poles to drive the rotor 110 in a manner similar to that described heretofore.

Another embodiment utilizing the invention, shown in FIG. 18, is a clock motor 500. The motor 500 comprises two flux carrying stator members 501 and 502 which have perpendicular legs 506 and 507, respectively. The rotor-stator capsule 100 is mounted lengthwise between the legs 506 and 507. A field coil 503 (shown schematically) is wrapped around two flux carrying members 504 and 505 which do not touch one another. The members 504 and 505 extend from the ends of the field coil 503 and are affixed to the members 501 and 502, respectively. A steel bridge 508 joins the members 501 and 502 and acts as a magnetic shunt to increase the inductance of the coil 503, thereby reducing the number of turns required for use on household voltage. Suitable gearing (not shown) couples the rotor shaft 111 to the clock movement.

The members 501, 502 and 504—508 comprise parts of cold rolled steel. In other embodiments these members are stamped or otherwise formed form a single piece.

A stepper motor 600 according to the invention is generally shown in FIG. 19. The motor 600 comprises a structure similar in some respects to the embodiment of FIG. 17 but with the addition of a permanent magnet 609 in parallel magnetic circuit relationship with the rotor-stator device 100.

The stepper motor 600 includes two L-shaped stator members 401' and 402' and a field coil 403' which are constructed and arranged in a manner similar to the construction and arrangement of the member 401 and 402 and the coil 403 shown in FIG. 17. Bridging the L-shaped members 401' and 402' between the rotor-stator device 100 and the coil 403' is a permanent magnet 609. The magnet 609 is arranged such that it provides a biasing magnetic flux to the roto-stator device through the members 401' and 402' which is opposite to, but less than, the magnetic flux provided across the rotor-stator device 100 when the coil 403' is energized. An airgap 606 is provided between the ends of the members 401' and 402' within the field coil 403' to ensure that the biasing magnetic flux flows primarily through the rotor-stator device.

In this arrangement the rotor 110 (FIG. 1) rotates a full 360 mechanical degrees for each electrical input pulse to the coil 403'. When the coil 403' is energized, the net magnetic flux applied to the rotor-stator capsule 100 through the members 401' and 402' causes the rotor 110 to rotate 180 mechanical degrees. When the coil is deenergized, there is a magnetic flux reversal since only the bias flux from the magnet 609 remains, and the rotor 110 rotates an additional 180 mechanical degrees. The arrangement is such that the rotor completes a full 360° revolution for each energization and deenergization of the coil 403' in response to the application of a single input pulse to the coil leads 404' and 405'. The revolutions of the rotor in response to successive pulses are in the same direction because of the unidirectional characteristics of the rotor-stator device 100 as discussed in reference to the embodiment of FIGS. 1—6. Because the rotor has a low rotational inertia, the rotor-stator device 100 has nearly instantaneous response to each input pulse to the coil 403'.

Another stepper motor arrangement utilizing the rotor-stator device 100 is illustrated in FIG. 20. This is generally similar to the structure of FIG. 1 except that it includes magnetic biasing means and a cup-shaped housing member 701 having a peripheral flange 704 which is secured to the base plate 116'. Interposed between the flange 704 and the base plate 116' adjacent one end of the rotor-stator device 100 is an annular permanent magnet 703. A second permanent magnet 705 of disc-shaped configuration is interposed between the opposite end of the rotor-stator device 100 and the cup-shaped member 701. The magnets 703 and 705 are made of a material having a high coercivity and a high magnetic energy product. The magnets are of the same thickness and are arranged such that they may be readily removed to convert the apparatus to the motor shown in FIGS. 1—6. Other arrangements utilize only one of the magnets 703 and 705 and a shortened cup-shaped housing member.

The magnets 703 and 705 are polarized to provide a magnetic biasing flux across the rotor-stator device 100 which is opposite to, but less than, the flux provided by the energized field coil 120'. In embodiments in which the current pulses applied to the field coil 120' produce a north pole on the right side of the coil and a south pole on the left side as viewed in FIG. 20, the permanent magnet 703 is provided with a north pole on the side in contact with the base plate 116' and a south pole on the side in contact with the housing flange 704. The permanent magnet 705 has a south pole on the side facing the coil and a north pole on the side in contact with the housing member 701. The magnets 703 and 705 are in a series magnetic circuit relationship with each other and produce a combined flux which is less than and opposed to the flux provided by the energized field coil 120' across the rotor-stator device 100. In other arrangements, wherein the field coil 120' is supplied with current pulses of a polarity such that the right side of the coil becomes a south pole and the left side a north pole, the permanent magnets 703 and 705 have opposite polarities from those described above.

When the coil 120' is energized, upon receipt of the first current pulse, the net magnetic flux applied to the rotor-stator capsule 100 causes the rotor 110 to rotate 180 mechanical degrees. When the coil 120' is deenergized, upon termination of the pulse, there is a magnetic flux reversal since only the bias flux from the permanent magnets 703 and 705 remains, and the rotor 110 rotates an additional 180 mechanical degrees. The rotor-stator device 100 has unidirectional rotation, as discussed above with reference to the embodiment of FIGS. 1—6. For each pulse and corresponding energization and deenergization of the field coil 120', the rotor 110 rotates a full 360 mechanical degrees.

FIG. 21 illustrates a still further stepper motor arrangement employing the rotor-stator device 100. Added to the structure of FIG. 17 are two permanent magnets 801 and 802 interposed between the rotor-stator device and the ends of the stator pole members 401'' and 402'', respectively. The bearings 112 and 113 are respectively fitted into mating holes in the magnets 801 and 802. These magnets have a high coercivity and a high magnetic energy product and are polarized to provide a biasing flux opposite to, but less than, the field flux generated across the rotor-stator device 100 by an energizing coil 403''. The motor of FIG. 21 operates in substantially the same manner as the motors of FIGS. 19 and 20 to provide a nearly instantaneous response and a full 360 mechanical degrees of rotation for each electrical input pulse to the field coil 403''.

FIGS. 22 and 23 illustrate a meter motor using the rotor-stator device 100. As discussed above, the rotor-stator device 100 is responsive to a source of varying magnetic flux in magnetic circuit relationship with the pole pieces 130 and 140 (FIG. 1). Thus, in the arrangement shown in FIGS. 22 and 23, a current carrying main bus 904 is flanked by two parallel stator pole members 901 and 902 which extend on opposite sides of the bus 904 in directions parallel thereto. The members 901 and 902 support the rotor-stator device 100 adjacent their left ends, as viewed in FIG. 22, by the bearings 112 and 113 respectively. If the current in the main bus 902 is varying and of sufficient magnitude (approximating at least 100 amperes in the illustrative embodiment shown in FIGS. 22 and 23), the varying magnetic flux surrounding the main bus 904 is induced in the members 901 and 902 and passes through them to operate the rotor-stator device 100 in a manner similar to that described heretofore. A magnetic shunt member 903 is provided to bridge the members 901 and 902 to serve as an alternate magnetic flux path in cases in which the main bus 904 is carrying currents of excessive magnitude. The members 901—903 are made of iron, cold rolled steel or other magnetic material.

In all embodiments heretofore discussed, a cylindrical permanent magnet rotor is employed with nonsalient rotor poles, with the result that the motor exhibits particularly good operating characteristics and a high output torque. In situations in which different operating characteristics are desired, a nonpermanently magnetized rotor may be employed, such as a squirrel cage rotor or a salient pole rotor, for example.

The terms and expressions which have been employed are use as terms of description and not of limitation, and there is no intention, in the use of such terms and expressions, of excluding equivalents of the features shown and described, or portions thereof, it being recognized that various modifications are possible within the scope of the invention claimed.

I claim:

1. A rotor-stator device for cooperation with an external source of magnetic flux to form an electric-rotating machine, said device comprising a permanent magnet cylindrical rotor and a stator structure of generally cylindrical configuration in coaxial relationship with said rotor and forming a housing for said rotor, said stator structure including a pair of pole pieces each having a flat portion and salient poles projecting from the periphery of said flat portion in spaced relationship with said rotor to define an airgap therebetween, said stator structure also including shading means at least partially disposed in the airgap between selected ones of said poles and said rotor, to provide said rotor with a unidirectional self-starting characteristic upon the application of magnetic flux to the stator structure from a flux source external to said housing.

2. A rotor-stator device as set forth in claim 1, in which the stator structure includes not more than two shaded salient stator poles and not more than two unshaded salient stator poles, there being only a single pair of nonsalient poles on said rotor.

3. A rotor-stator device as set forth in claim 1, in which each of said pole pieces includes a bearing mounted in said flat portion.

4. An electric rotating machine comprising the rotor-stator device of claim 1, a source of varying magnetic flux, and means disposed adjacent opposed ends of said rotor-stator device for transmitting the magnetic flux from said source to said rotor-stator device.

5. A rotor-stator device comprising a cylindrical permanent magnet rotor having a greater length than diameter, a stator structure of generally cylindrical configuration in coaxial relationship with said rotor, said stator structure including a pair of pole pieces, each of said pole pieces having a flat portion and a plurality of salient poles projecting from the periphery of said flat portion, said pole pieces being disposed adjacent opposite ends of said rotor with said salient poles arranged in an arcuate array around said rotor in spaced relationship therewith to define a gap between said rotor and said stator structure, and means disposed within said gap for shading selected ones of said stator poles.

6. A rotor-stator device comprising a permanent magnet rotor having at least one pair of rotor poles, and a cylindrical stator structure in coaxial relationship with said rotor, said stator structure including a plurality of pole pieces each having a flat portion and a pair of salient poles protruding from the periphery of said flat portion and including a generally tubular shading member coextensive with and surrounding said rotor for shading selected ones of said salient poles.

7. A rotor-stator device comprising a permanent magnet rotor having at least one pair of nonsalient rotor poles, and a stator structure of generally cylindrical configuration disposed about said rotor, said stator structure including a plurality of ferromagnetic pole pieces each having a flat portion and a pair of salient poles projecting perpendicularly from the periphery of said flat portion, and including a shading member for shading one of the salient poles on each pole piece, the shading member being interwoven with said salient poles and surrounding said rotor to form a dust cover therefor.

8. A rotor-stator device comprising a permanent magnet rotor having at least one pair of rotor poles, and a stator structure of generally cylindrical configuration disposed about said rotor, said stator structure including a plurality of pole pieces each having a flat portion and a pair of salient poles projecting perpendicularly from said portion in spaced relationship with said rotor to define an airgap therebetween, said stator structure also including a shading member for shading one of the salient poles on each pole piece, the shading member being at least partially disposed in the airgap between the shaded salient poles and said rotor, said shading member interconnecting said pole pieces and surrounding said rotor to form a dust cover therefor.

9. A rotor-stator device comprising a cylindrical permanent magnet rotor having an axial length greater than its diameter and including at least one pair of nonsalient rotor poles, and a cylindrical stator structure disposed about said rotor, said stator structure including a plurality of ferromagnetic pole pieces each having a flat portion and a pair of salient poles projecting perpendicularly from the periphery of said flat portion, said salient poles extending in an arcuate array around said rotor in spaced relationship therewith to define a cylindrical airgap between the rotor and the stator structure, and a generally tubular member having a first sleeve portion located in said airgap and a second portion interwoven with said salient poles for shading one of the salient poles of each pole piece, said sleeve portion surrounding said rotor to form a dust cover therefor.

10. A rotor-stator device for cooperation with an external field coil to form an electric rotating machine, said device comprising a cylindrical rotor having a pair of permanently magnetized rotor poles, a pair of stator pole pieces including flat portions respectively disposed adjacent opposite ends of said rotor, each of said stator pole pieces having two salient stator poles projecting from the periphery of the flat portion thereof in directions parallel to the axis of said rotor and in spaced relationship with the cylindrical surface of the rotor, means carried by the flat portions of the pole pieces for rotatably supporting said rotor, and shading means including at least one tubular member surrounding said rotor between said flat portions, said tubular member being interwoven with said stator poles such that portions of the tubular member are externally disposed with respect to certain of said stator poles and alternate portions of the tubular member are positioned between the remaining stator poles and said rotor, said shading means forming an enclosure for said rotor, said stator poles and said shading means providing said rotor with a unidirectional self-starting characteristic upon the energization of a field coil surround said shading means.

11. A rotor-stator device for cooperation with an external field coil to form an electric rotating machine, said device comprising a cylindrical rotor having a length greater than its diameter and only a single pair of nonsalient permanently magnetized rotor poles, a pair of stator pole pieces including flat portions respectively disposed adjacent opposite ends of said rotor, each of said stator pole pieces having only two salient stator poles projecting from the flat portion thereof in directions parallel to the axis of said rotor and in spaced relationship with the cylindrical surface of the rotor, one of the salient stator poles on each pole piece being closer to said cylindrical surface than the other salient stator pole and the pole pieces being arranged with the closer stator poles alternating with the remaining stator poles to form a substantially cylindrical array of stator poles around the periphery of the rotor, means carried by the flat portions of the pole pieces for rotatably supporting said rotor, and shading means including an elongated sleeve surrounding said rotor between said flat portions, said sleeve being interwoven with said stator poles such that portions of the sleeve are externally disposed with respect to said closer stator poles and alternate portions of the sleeve are positioned between the remaining stator poles and said rotor, said shading means forming an enclosure for said rotor and maintaining said stator poles in fixed relationship with each other, said stator poles and said shading means providing said rotor with a unidirectional self-starting characteristic upon the energization of a field coil surround said shading means.

12. A rotor-stator device for cooperation with an external field coil to form an electric rotating machine, said device comprising a cylindrical rotor having a length greater than its diameter and only a single pair of nonsalient permanently magnetized rotor poles, a pair of stator pole pieces including flat portions respectively disposed adjacent opposite ends of said rotor, each of said stator pole pieces having only two salient stator poles projecting from the periphery of the flat portion thereof in directions parallel to the axis of said rotor and in spaced relationship with the cylindrical surface of the rotor, one of the salient stator poles on each pole piece being closer to said cylindrical surface than the other salient stator pole and the pole pieces being arranged with the closer stator poles alternating with the remaining stator poles to form a substantially cylindrical array of stator poles around the periphery of the rotor, means carried by the flat portions of the pole pieces for rotatably supporting said rotor, and shading means including first and second tubular members surrounding said rotor between said flat portions, said first tubular member being interposed between said rotor and said arcuate array of stator poles with portions of the first tubular member in contact with the closer poles, said second tubular member being interwoven with said stator poles such that portions of the second tubular member are externally disposed with respect to said closer stator poles and alternate portions of the second tubular member are positioned between the first tubular member and the remaining stator poles, said shading means forming an enclosure for said rotor and maintaining said stator poles in fixed relationship with each other, said stator poles and said shading means providing said rotor with a unidirectional self-starting characteristic upon the energization of a field coil surround said shading means.

13. A rotor-stator device for cooperation with an external source of magnetic flux to form an electric-rotating machine, said device comprising a permanent magnet cylindrical rotor and a stator structure of generally cylindrical configuration in coaxial relationship with said rotor and forming a housing for said rotor, said stator structure including a pair of pole pieces each having a flat portion and salient poles projecting from the periphery of said flat portion and means for shading selected ones of said poles, to provide said rotor with a unidirectional self-starting characteristic upon the application of magnetic flux to the stator structure from a flux source external to said housing, a magnetic structure having two arms between which said rotor-stator device is mounted, and a field coil for generating magnetic flux in said arms of said magnetic structure.

14. A rotor-stator device for cooperation with an external source of magnetic flux to form an electric-rotating machine, said device comprising a permanent magnet cylindrical rotor and a stator structure of generally cylindrical configuration in coaxial relationship with said rotor and forming a housing for said rotor, said stator structure including a pair of pole pieces each having a flat portion and salient poles projecting from the periphery of said flat portion and means for shading selected ones of said poles, to provide said rotor with a unidirectional self-starting characteristic upon the application of magnetic flux to the stator structure from a flux source external to said housing, two magnetic members disposed adjacent opposite ends of said rotor-stator device, a field coil for generating a magnetic flux in said members when said field coil is energized, and permanent magnet means in magnetic circuit relationship with said members for generating a magnetic biasing flux passing through said rotor-stator device with a strength and direction which is respectively less than and opposed to the flux generated by said field coil.

15. A stepper motor as in claim 14, in which said field coil is in coaxial relationship with said rotor-stator device, one of said magnetic members being cup-shaped and together with the other said magnetic member forming a housing for said field coil and said rotor-stator device, said permanent magnet means including a permanent magnet disposed between said two magnetic members.

16. A stepper motor as in claim 14, in which said permanent magnet means includes two permanently magnetic members respectively disposed between opposite ends of said rotor-stator device and said magnetic members.

PO-1050
(5/69)

UNITED STATES PATENT OFFICE
CERTIFICATE OF CORRECTION

Patent No. __3,564,314__  Dated __February 16, 1971__

Inventor(s) __Arthur W. Haydon__

It is certified that error appears in the above-identified patent and that said Letters Patent are hereby corrected as shown below:

Change the inventor's address to read --Middlebury, Connectic

Abstract, line 5, ", each" should be --. Each--.

Col. 1, line 14, "factional" should be --fractional--.

Col. 4, line 8, "an" should be deleted.

Col. 4, line 29, "$BaFe_1 2O_1 9$" should be --$BaFe_{12}O_{19}$--.

Col. 5, line 65, a period should be added after "238".

Col. 6, line 43, "rotor" should be --rotor 110"--.

Col. 7, line 12, "aNd" should be --and--.

Col. 7, line 45, "form" should be --from--.

Col. 7, line 59, "roto-stator" should be --rotor-stator--.

Signed and sealed this 19th day of October 1971.

(SEAL)
Attest:

EDWARD M. FLETCHER, JR.
Attesting Officer

ROBERT GOTTSCHALK
Acting Commissioner of Patent